United States Patent [19]

Oppenheimer

[11] Patent Number: 5,644,726
[45] Date of Patent: Jul. 1, 1997

[54] METHOD AND SYSTEM IMPLEMENTING A MORTGAGE PARTNERSHIP

[76] Inventor: Robert H. Oppenheimer, 67 Thornberry Rd., Winchester, Mass. 01890

[21] Appl. No.: 495,393

[22] Filed: Mar. 19, 1990

Related U.S. Application Data

[63] Continuation-in-part of Ser. No. 356,853, May 25, 1989, abandoned.

[51] Int. Cl.$^6$ ..................................................... G06F 19/00
[52] U.S. Cl. ........................... 395/238; 395/235; 395/236
[58] Field of Search ............................ 364/401; 395/235, 395/236, 238

[56] References Cited

U.S. PATENT DOCUMENTS

| | | |
|---|---|---|
| 4,642,768 | 2/1987 | Roberts . |
| 4,722,055 | 1/1988 | Roberts . |
| 4,750,119 | 6/1988 | Cohen et al. . |
| 4,752,877 | 6/1988 | Roberts . |
| 4,766,539 | 8/1988 | Fox . |
| 4,774,663 | 9/1988 | Musmanno et al. . |

OTHER PUBLICATIONS

E. L. Andrews, Patents– Financial Instruments Protected– Dec. 30, 1989 New York Times 1 page.
Donovan, James J. TH, Either A Creditor or A Partner Be, Real Estate Acct & Tax, V4N2 pp. 82–84, 1989 Abstract: AN 89–31939 "Mortgage", Real Estate Software, Abstract (Orbit file Microsearch) AN 85–027439.

*Primary Examiner*—Gail O. Hayes
*Assistant Examiner*—Gita Shingala
*Attorney, Agent, or Firm*—Wolf, Greenfield & Sacks, P.C.

[57] ABSTRACT

A process of and method for financing purchase of real property by mortgagors through a combination of mortgagee debt principal and partial mortgagee equity interest in the purchased property by a system which both calculates multiple mortgagor financial obligations and mortgagee rights and which prints instruments embodying those obligations and rights. The system also employs generally available house price indices as proxies for equity values, produces periodic reports to mortgagors of obligated balances, and determines mortgagee and mortgagor balances upon sale and/or termination of instruments produced by the system.

26 Claims, 4 Drawing Sheets

METHOD AND SYSTEM IMPLEMENTING A MORTGAGE PARTNERSHIP

This application is a continuation-in-part of my application filed May 25, 1989 as Ser. No. 07/356.853 now abandoned.

FIELD OF THE INVENTION

This invention relates to the financing of real property, primarily residential housing. More particularly, the present invention pertains to a process of and method for creating single mortgage documents with multi-part obligations, one of which finances real property ownership through a combination of mortgage debt and equity participation in underlying real property values.

BACKGROUND OF THE INVENTION

Traditionally residential mortgage lending has involved a two-fold evaluation of the loan repayment ability of prospective homeowners and mortgage applicants. This process encompasses a simultaneous assessment of: 1)payment affordability (i.e., the percentage of application income required to make monthly mortgage payments) and 2)underlying collateral value in case of foreclosure and resale (i.e., Loan-To-Value ratios: the ratio of principal obligation to appraised house value ). Together, these factors have formed the credit risk of mortgage lending.

Before the last two decades, mortgage lenders assumed that fixed mortgage loan payments, calculated at fixed nominal rates of interest over typical fives of fifteen to thirty year loans, would provide them a fixed, but reliable, financial return on their capital. These lenders implicitly relied upon a continuation of low and stable inflation and interest rates over the entire life of their mortgage loans.

Events during the 1970s, however, dramatically altered this assumption. The market value of outstanding mortgage loans, with their lower and fixed rates and long maturities, were now seriously eroded by enormous surges in inflation and interest rates during this period. Tied into fixed low interest-bearing loans over extended repayment periods, lenders discovered a new financial return, or interest rate, risk now inherent in all mortgage lending.

At the same time, moreover, house prices increased dramatically, not only as an immediate result of inflation, but as a perfect hedge against further inflation. Prospective new homeowners now faced the prospect of dramatically larger and typically unaffordable mortgage payments. This resulted, not only from the repayment of higher principal balances on much higher-priced housing, but the compounding effect of higher mortgage interest rates on the higher mortgage principal. Since fewer people could afford these higher payments, fewer prospective homeowners could meet the credit (or affordability) criteria of mortgage lenders.

A number of new mortgage instruments, generally termed Adjustable Rate Mortgages (ARMs), arose that shifted the interest rate risk to borrowers, but did not solve the real financing problems. Lenders, faced with the uncertainty of future inflation and interest rates eroding the value of prospective loans, offered mortgages wherein monthly payments would vary based upon changes in future interest rate indices as generally tied to federal fund rates. These instruments used the indices as proxies for adjustments to new levels of interest cost owed and payable by the homeowner or, equivalently, rates of return required by the lender.

One kind of instrument, the Shared Appreciation Mortgage (SAM), transferred the interest rate risk to homeowners by offering fixed lower interest rates and monthly mortgage payments in return for a share in any appreciation in the mortgaged house. The lender, however, did not reciprocally share with the homeowners any losses on the value of the house over the mortgage duration.

These mortgages proved unmarketable for several reasons. First of all, the SAM required a costly and uncertain specific house appraisal to determine the lender's share, if any, of appreciation after forced refinancing in ten years. Secondly, the homeowner had to refinance, not only the remaining mortgage principal, but original lender's share of appreciation. Finally, the homeowner had no way of fixing, at the inception of the SAM mortgage, his monthly mortgage payment obligations after the initial ten year refinancing.

None of these new mortgage instruments, however, have done anything to address the underlying mortgage financing problems of insuring: 1) low and affordable monthly mortgage payments, 2) certainty in the mount of those payments over the life of the loan and 3) adequate financial returns to mortgage lenders in all future inflation and interest rate environments.

First of all, neither conventional fixed rate or ARM instruments provide a mechanism for actually funding higher borrowed principal and interest rates with lower monthly payments. As such, they cannot solve the first and most important problem, affordability.

Conventional fixed rate mortgages and ARMs alternately solve the second and third problems, but only by exacerbating the other. Fixed rate mortgages guarantee fixed payments, but only by exposing the lender to the interest rate risk over the lives of these loans. And while ARMs partially guarantee financial returns, they do so only by exposing the borrower to unknown and perhaps unaffordable future mortgage obligations. Therefore, certainty (against interest rate risk) for lenders (through ARMs) means uncertainty in payment for borrowers. And certainty in payment for borrowers (through fixed rate mortgages) means uncertainty (or interest rate risk) for lenders.

Moreover, ARMs can only really partially shift the interest rate risk and uncertainty to borrowers for several reasons. First of all, ARMs can be unmarketable in interest rate environments generally perceived as temporally low relative to the anticipated future. Just when lenders want interest rate protection against the future, borrowers baulk at the prospect of higher future payments under ARMs. Secondly, even if borrowers accept these loans, they may be unable to make higher monthly payments in the future. As such, the lender may be forced to foreclose and resell the house at a loss in the very housing finance market that led to original foreclosure. Finally, mortgages are uniquely homeowner, not lender, callable. After making modest penalty payments, the homeowner can refinance the mortgage loan in interest rate markets of his own choosing. The lender has no such equal election. In mortgage capital markets, this creates what is termed "negative convexity:" i.e., high rates of return do not persist (because of homeowner refinancings), while low rates do (because of fewer sales and no refinancings).

It is the primary object of the invention to create a process and method which simultaneously solves all of the home financing problems as outlined above. The invention accomplishes this by uniquely separating the legal notion of "ownership" between that of rights to "use and possession" and "equity investment." In mortgage agreements created with the subject invention the homeowner retains the traditional right of use and possession. But he now immediately surrenders a fixed equity share in the house to a new Joint Venture Partner (JVP). The invention is a system to calculate the estimated future value of the JVP share and other payments from inception of the loan through termination in order to assure a financial rate of return sufficient to attract mortgage investors (mortgagees).

The Joint Venture Partner is one of two sources of mortgage capital now financing homeowner purchase. Under a new single first mortgage (with a "cross default" provision in the case of foreclosure) there are two separate sections. The first, Section A, is a conventional mortgage loan (i.e., fixed rate mortgage or, alternately, an ARM). Section B is the homeowner's new Joint Venture Partner, who, in return for partial financing, obtains a substantial and fixed share in the value of the house from inception to termination of the agreement. At the end of the agreement (through sale, normal termination or foreclosure), the homeowner repays his Joint Venture Partner for his share of the house.

The instruments produced under the new invention simultaneously lower payments, fix amounts throughout the life of the new mortgages, and allow the homeowner to effectively defer some of the payment to termination. Since the latter mount will vary based upon the level of inflation and house prices during the course of the agreement, this also insures that the financial return on the JVP's investment reflects actual investment requirements. If inflation is high, the JVP will receive a larger amount. If low, the JVP receives a lower amount. As mutual investors, however, they both have an interest in house appreciation. Their interests are not competing as under conventional fixed vs. ARM loans, but fully aligned.

It is a further object of the invention to create a new two-section single first mortgage, which creates two new investment vehicles in one instrument. While the mortgage capital source can purchase and hold both Section A and B of the single mortgage, they can also be sold separately or accumulated as the collateral for mortgage-backed securities. The Section A pan is ideal for traditional mortgage capital sources because it embodies the elements of conventional loan agreements. Section B is ideal for long-term investors, such as pension funds, who want long maturities with hedges against erosion in investment values due to inflation.

It is another object of the invention to restabilize all aspects of the residential construction and financing markets. Alternate "booms" and "busts" currently plague these industries because small changes in interest rates dramatically expand or alternately contract the pool of prospective homeowners. Builders commencing construction in low interest rate markets often are forced to sell houses quickly and at a loss to repay construction loans after rates have increased during construction. Similarly, homeowners often cannot sell their houses at all during these periods of high interest rates.

The invention solves this problems by largely insulating prospective homeowners from current interest rate levels. Both home builders and home sellers now have the opportunity to become Joint Venture Partners with prospective buyers by effectively repurchasing a share in houses financed through this mortgage. Instead of absorbing losses under forced sale, they temporarily repurchase and equity interest and can resell the JVP Section equity to permanent investors.

It is still another object of the invention to facilitate new ownership opportunities for renters by effectively lowering the operating costs of landlords. Currently, landlords must set rents at levels to cover both costs of maintenance and upkeep and damage upon lease expiration. Under mortgages created by the new invention, these costs are either eliminated or willingly absorbed by the current renters (or new owners), who are newly invested in the upkeep and future value of the occupied property. As such, this invention provides a more cost-effective and affordable ownership option to renters than traditional condominium conversion. The above also applies to landlords who rent single family dwellings as well as commercial real estate.

SUMMARY OF THE INVENTION

This invention creates new mortgage instruments through the use of a computer system that embodies a process of and method for calculating payment obligations which simultaneously and uniquely:

1) provide substantially lower (and optionally fixed) monthly payments to prospective owners of real property than conventional mortgage documents, 2) create, through an equity share in real property, the opportunity for higher rates of return to mortgagees and the ability to assure preservation of those returns under varying inflation and interest rate environments during the life of these mortgages, 3) develop a new single first mortgage with two parts, Section A and B, (under a "cross-default" provision in the event of foreclosure), which can be separately marketable or collateralized within mortgage-backed securities.

The novelty of the invention is its mechanism for guaranteeing substantially lower homeowner payments, while simultaneously assuring attractive and safe financial returns to mortgage investors. This is accomplished by having the prospective homeowner (mortgagor) become both part borrower and part joint equity venturer with the mortgagee. Whenever a prospective home purchaser applies for credit under the terms of the new mortgage, the invention, through calculations performed by a computer, determines the required down-payment and Section A and B principal to finance purchase under assumptions of current market interest rates and projected increases in house prices. The computer system then calculates and prints the monthly payment obligations of the mortgagor.

Of the total principal normally required to finance purchase, the homeowner only borrows part of this mount from Section A. This section has the characteristics of conventional fixed-rate (or, alternatively, ARM) loans and is separately marketable as such. The homeowner makes monthly payments only on the Section A principal for the first years, usually fifteen, completely paying off the principal obligation at the end of this time. The Section A mortgage is not separate mortgage, however, but one part of a two-part instrument, which are only issuable together.

Section B principal has two parts: debt and joint venture equity. The debt principal reflects the amount of capital contributed to the house financing by Section B (i.e., house price, less down payment and Section A principal). The Section B debt principal, which remains unpaid until the Section A obligations are terminated, is then paid off over the last years of the usual 20 year mortgage. (These payments approximately equal the same monthly payments made under Section A.) The value of Section B's equity share also increases over the life of the mortgage because the Section A mortgage payments, by reducing the Section A principal, also increases the net equity of both joint venture partners: homeowner and the Section B holder.

Since Section B must typically wait 15 years before receiving any repayment, the primary financial return is Section B's Joint Venture Partner equity in the value of the house. As a true JVP the Section B holder shares in the total value of the house, including any appreciation (or depreciation) in its value, at its equity percentage, typically 50%. The value of the JVP share is calculated by using a change in a local house price index as a proxy for the change in house value and multiplying the percent JVP share times this amount. If termination occurs within a certain time period from inception, there is an additional cap or limit calculation to assure that the total Section B return on investment does not exceed a stated maximum percent.

The homeowner can sell or refinance the house at any time, allow the agreement to terminate at the end of its stated term or otherwise face foreclosure during its term. In all these settlement cases, the proceeds of the sale are compared first with the outstanding principal obligations of both Section A and B. For Section A this is simply the outstanding debt principal. For Section B it is the sum of the outstanding debt principal and the value of its joint venture equity share. If the proceeds of the sale are less than the outstanding Section A and B principal (i.e., in foreclosure), the cross-default provision applies. The proceeds are used to repay Section A and B only and in proportion to their principal balances. If the proceeds are greater, Section A and B are fully repaid with the balance of any proceeds going fully to the homeowner.

The mortgage system, embodied within a computer, includes the following components: 1) issuance, 2) origination, 3) servicing, and 4) settlement. The issuance process allows for the input of parameters or financial terms for the creation of new mortgage instruments. This process assures that mortgagees will receive rates of return sufficient to attract the issuer's mortgage capital. Origination provides for the quotation of monthly payment rates and initial financing obligations to prospective mortgagors and printing of mortgage agreements under those terms. Servicing includes the processing of mortgage payments and printing periodic statements to mortgagors from inception of the mortgage through termination, at which time the system calculates a final settlement of mortgagor and mortgagee obligations.

BRIEF DESCRIPTION OF THE DRAWING

These and other aspects and advantages of the present invention are explained in the detailed description and claims which make reference to the accompanying tables, diagrams and flowcharts as one embodiment of a system in accordance with the present invention.

Figure 1:
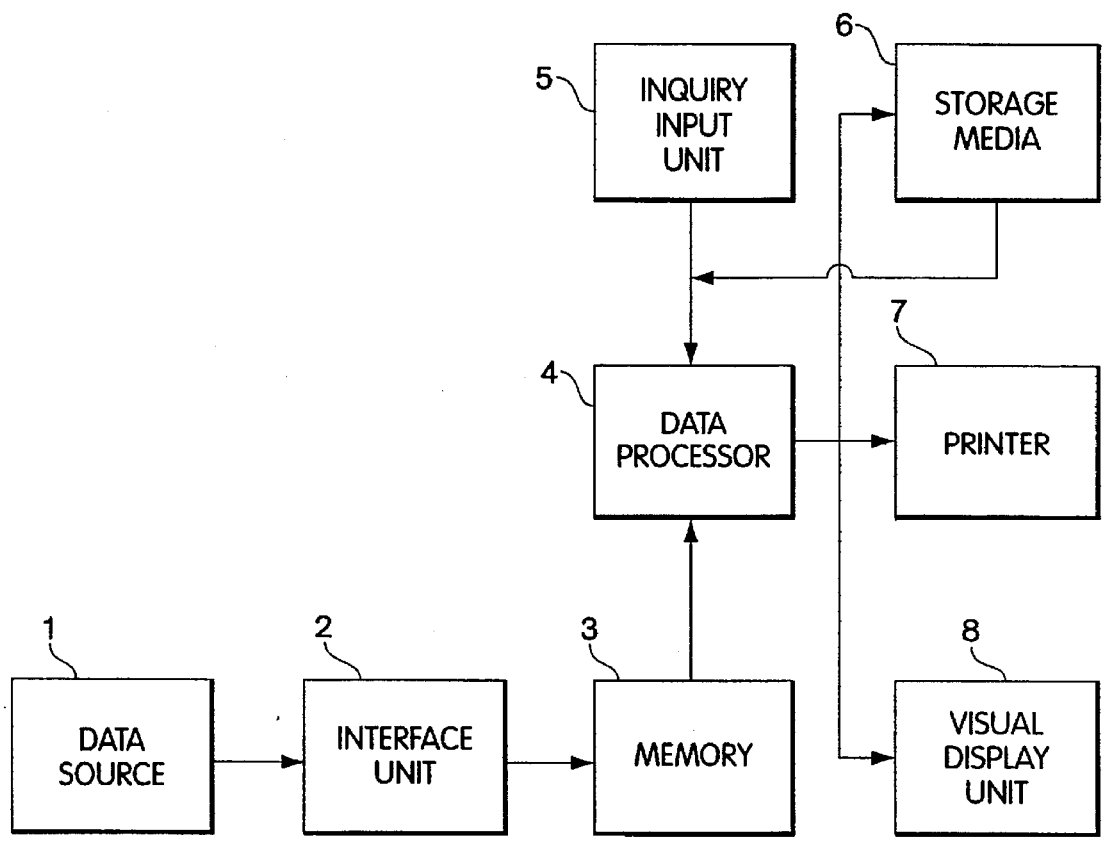
FIG. 1 is a schematic diagram depicting the overall computer system used in one embodiment of the invention.

In addition, there are a series of tables which both define input and output variables used in the above processes and show sample calculations as follows:

Table 1 defines all input and output variables used in one embodiment of the system. All variables in the Table include: an alphabetic reference or abbreviation, a verbal definition, sample data used in an example calculation (as referenced in the tables below) and a complete specification of its definition and use relative to other variables. The specification of some of these variables reference financial functions which are more fully defined at the end of the Table.

Table 2 shows an example of output produced by the system. This output uses the sample data for each variable as per Table 1 above and demonstrates the issuance, origination and settlement processes in one embodiment of the system.

Table 2A presents the same output as Table 2, but uses the alphabetic variable abbreviations from Table 1 in place of the sample data from Table 2 to facilitate exact reference of variable use from Table 1 to the sample output in Table 2.

Table 3 shows an example of a statement produced periodically for the mortgagee as part of the servicing process. The example references the same data from Table 1.

Table 3A presents the same output as Table 3, but uses the alphabetic variable abbreviations from Table 1 in place of the sample data from Table 3 to facilitate exact reference of variable use from Table 1 to the sample output of Table 3.

DETAILED DESCRIPTION OF THE INVENTION

The new mortgage system is a process of and method for issuing, originating, servicing, and settling single-issue, multi-part mortgage documents, where one of these mortgage obligations provides for a mortgagee equity interest. FIG. 2 depicts each component of the system and Table 1 lists and defines all input and output variables used therein and, additionally in the case of output variables, the calculations of same. Together, Tables 1 through 3 demonstrate an example of the calculations embodied in the system and output available.

The following is an overview of the system as summarized in FIG. 2, including an outline of the major data, processes and uses of the system.

Issuance allows for authorized sources to input different parameters for the creation of these new mortgage instruments. These parameters reflect the overall term of the instrument and the investment return requirements of both Section A and Section B mortgagees. Additionally, two parameters dictate assumable levels of credit risk on prospective mortgagors: percentage of minimum down payment and the maximum Section B Joint Venture equity share. Both of these parameters insure that the prospective homeowner has an adequate financial stake or equity in his or her own home. There are two additional factors specific to Section B. An investment return limit or cap of variable percent and applicable period from inception prevents an excessive return to Section B for early mortgage terminations. The last factor, the Selling Allowance, may provide for a Section B variable percentage sharing of the cost of house sale at termination.

All of the above factors are fully described in Table 1 in the "Issuer Input Variables" section. The system then converts these variables into "Issuer Output Variables" as defined in the same Table 1. These are largely transformations of annual interest and term parameters to be on a monthly basis for use in later calculations. Once this process is completed, the system then produces an output media (a diskette in the preferred embodiment, but may include electronic transmission) for transmittal to contracting originators. The diskette includes all values for the above variables and the computer system itself.

Contracting originators then receive and input mortgage application data into the system. This data, referenced as "Inception Input Variables" in Table 1, includes the mortgagor- specific parameters of: 1) house purchase price, 2) actual homeowner percent down payment, and 3) the house price index in the locality of the house. This provides for the quotation of monthly payment rates and initial financing obligations to prospective mortgagors and, if accepted by homeowners, printing of mortgage agreements under those terms.

As part of the origination process, the system can also calculate pro-forma settlement results based on additional input parameters, referred to as "Termination Input Variables." Prospective mortgagors can, therefore, assess the value of his or her share of the house at termination and the future value of the savings in monthly mortgage payment over conventional loans under termination assumptions of homeowner choosing.

For all mortgages written under the above origination process, the system stores all of the above data on new mortgages, except pro-forma termination data, in a mortgage master file. Mortgages are then ready to be serviced monthly. Servicing includes the receipt and posting of mortgage payments, assessment of late charges, updating of house indices, calculating new mortgage balances and printing of monthly statements to mortgagors. Since the new invention has both multi-part obligations and an equity interest based on house prices, the system produces mounts which are unique to these monthly statements and uniquely calculated by this new mortgage system. These statements not only reflect outstanding and unpaid mortgage balances, but the value of the homeowner's equity share based on latest house price indices. In effect, therefore, the system calculates a pro-forma settlement on the assumptions that termination occurs at the time of each statement and the actual proceeds on sale equal the amount calculated by the latest house price index.

The servicing process, as described above, is repeated until termination. This occurs under the following circumstances: sale of house or homeowner-initiated refinancing, foreclosure, or the end of the stated term of the instrument. Table 1 contains the "Termination Input Variables" to this process. The system, first of all, determines the initial balance of Section A and B obligations as owed by the homeowner at time of settlement. For Section A and B this is the outstanding balances from the mortgage file, but for Section B, additionally includes the calculation of the JVP share. At this point, the actual amount of proceeds on sale are compared to these balances. Any excess of proceeds is distributed to the homeowner. Any deficit, as in foreclosure, reduces the Section A and B obligated balances in proportion to those balances. In addition, there is a cap calculation on the Section B JVP share to insure that early termination of the instrument does not lead to an excessive return to Section B. The calculation only applies during the first few years of the mortgage and uses a percentage return cap as a test against the actual investment return to Section B at this point.

As mentioned above, the pro-forma settlement calculations in the origination and servicing processes are essentially the same as actual settlement at termination. The only difference is the use of actual vs. pro-forma input data.

The following is a detailed description of a system in accordance with the present invention. Reference hereafter is made to FIGS. 1 through 3 as flowchart descriptions of the system; Table 1 as a list of variable abbreviations, definitions and calculations; and Tables 2 through 3A as sample output created by one embodiment of the system.

Figure 2A:
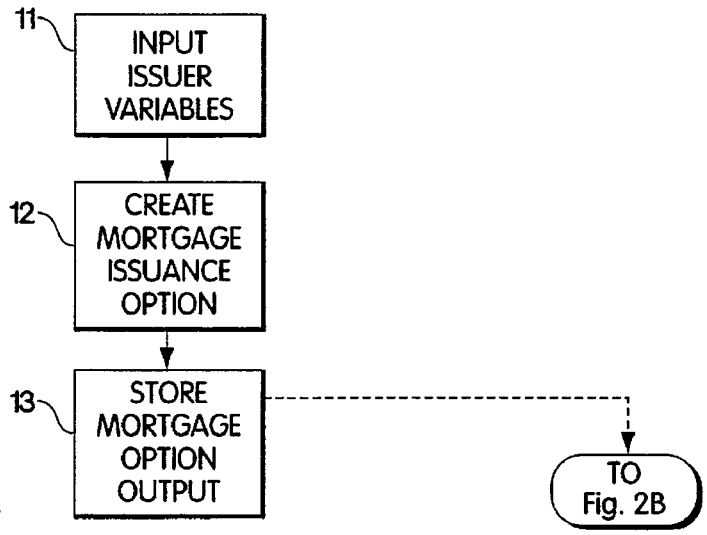
FIGS. 2A through 2D are schematic flowcharts depicting one embodiment of the computer system structure and processes in accordance with the principles of the invention. These are organized within the computer system components of: issuance (FIG. 2A), origination (FIG. 2B), servicing (FIG. 2C) and settlement (FIG. 2D).
Figure 3:
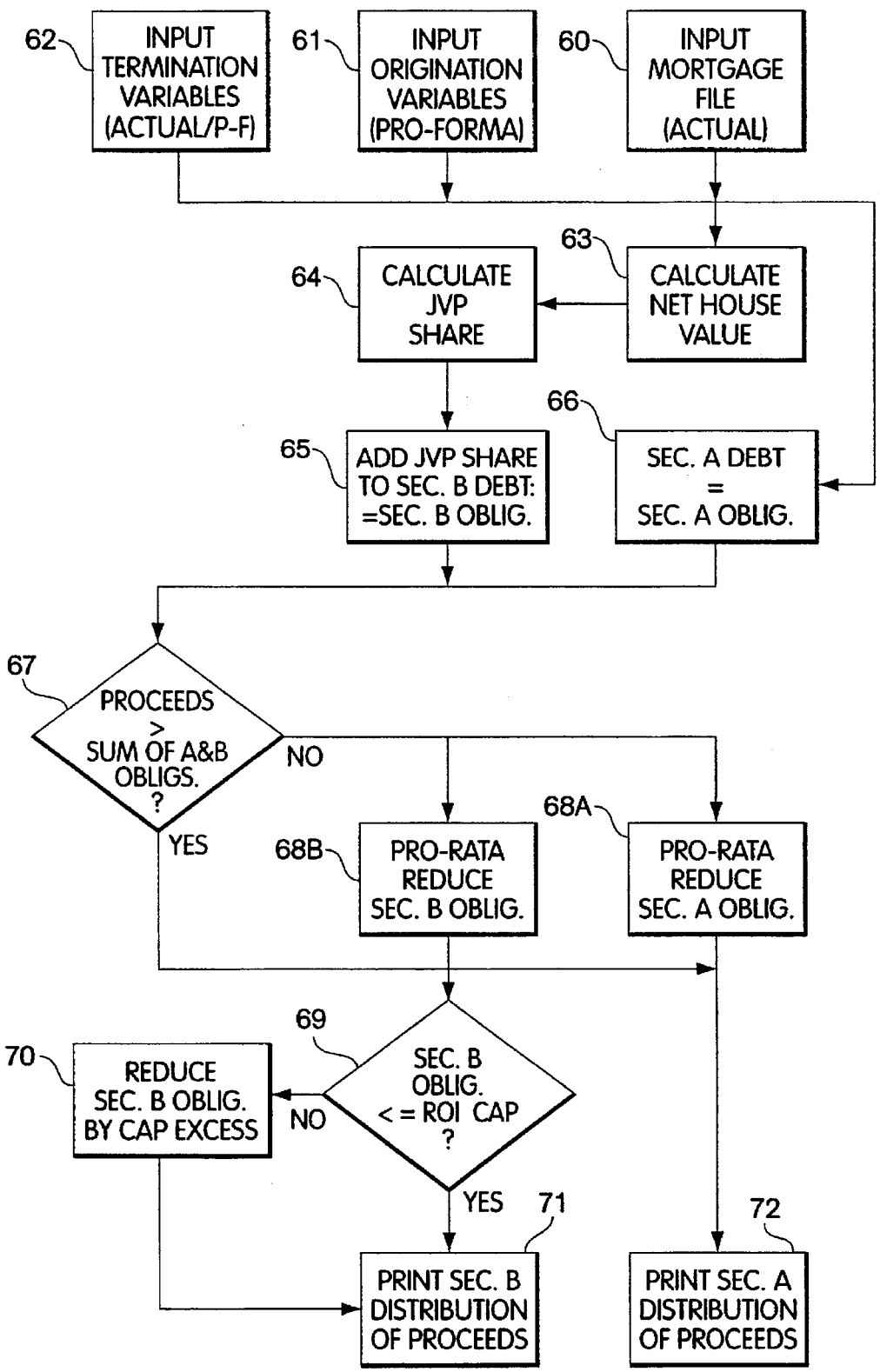
FIG. 3 is a schematic flowchart depicting in more detail the actual and pro-forma mortgage settlement calculations referenced in FIG. 2. The settlement process is used, not only within the settlement process (in FIG. 2D), but also in origination (FIG. 2B) and servicing (FIG. 2C) as well.

In the Issuance process as described at 11 in FIG. 2A data source 1(Issuer) applies the data as per Table 1(Issuer Input Variables) through a computer interface unit 2 and to its memory 3. Input variables include: the stated term of the entire mortgage instrument in years (a), the length of Section A in years (b), the minimum allowable down payment as a percent of house price (d), the annual stated interest rate on which Section A monthly payments are calculated (e), any annual premium or discount over e to calculate Section B payments (f), the Section B JVP equity share (g) and percentage of financing (c), a percentage allowance off the indexed house value at Termination before applying the JVP share (j), an average monthly percentage maximum return on investment limit (i), the months from inception within which the limit applies (h), and an optional Fee (k), if any, which can be assessed in the financing. Note that the values selected for the above variables are not limited by the nature of the calculations embodied in the invention, but rather by business practice and market conditions as defined by authorized issuers.

Once the Issuer has completed input of parameters for new mortgage issuances at 11, the data processor at 4 and mortgage system at 12 in FIG. 2 transforms the Issuer Input Variables into Issuer Output Variables. These can also be displayed at 8 and printed at 7. First, the length in years of the Section B mortgagee part (p) is calculated as the difference between the total and Section A term as input above. Note that the Section B term of monthly mortgage payments, as calculated below, begins after the close of the Section A payment period, which, in turn, begins at mortgage inception. Next, the system converts the total, Section A and Section B lengths of term and annual interest rates to a monthly basis with simple division by 12. Finally, the annual effective interest rates for both Section A and B are calculated by compounding the monthly rate for twelve months.

Tables 1 through 3A show an example of an instrument with twenty year (fifteen for Section A and five for Section B) life, 10% annual interest rates, a 50% Section B JVP equity share for 25% financing, a 6% selling allowance, a cap period of 36 months and monthly cap or ROI limit of 1.24%. The results of these calculations and the computer system is transferred via a diskette media in one embodiment at 6 and 13 to the origination process at 21 for input by authorized mortgage originators.

Figure 2B:
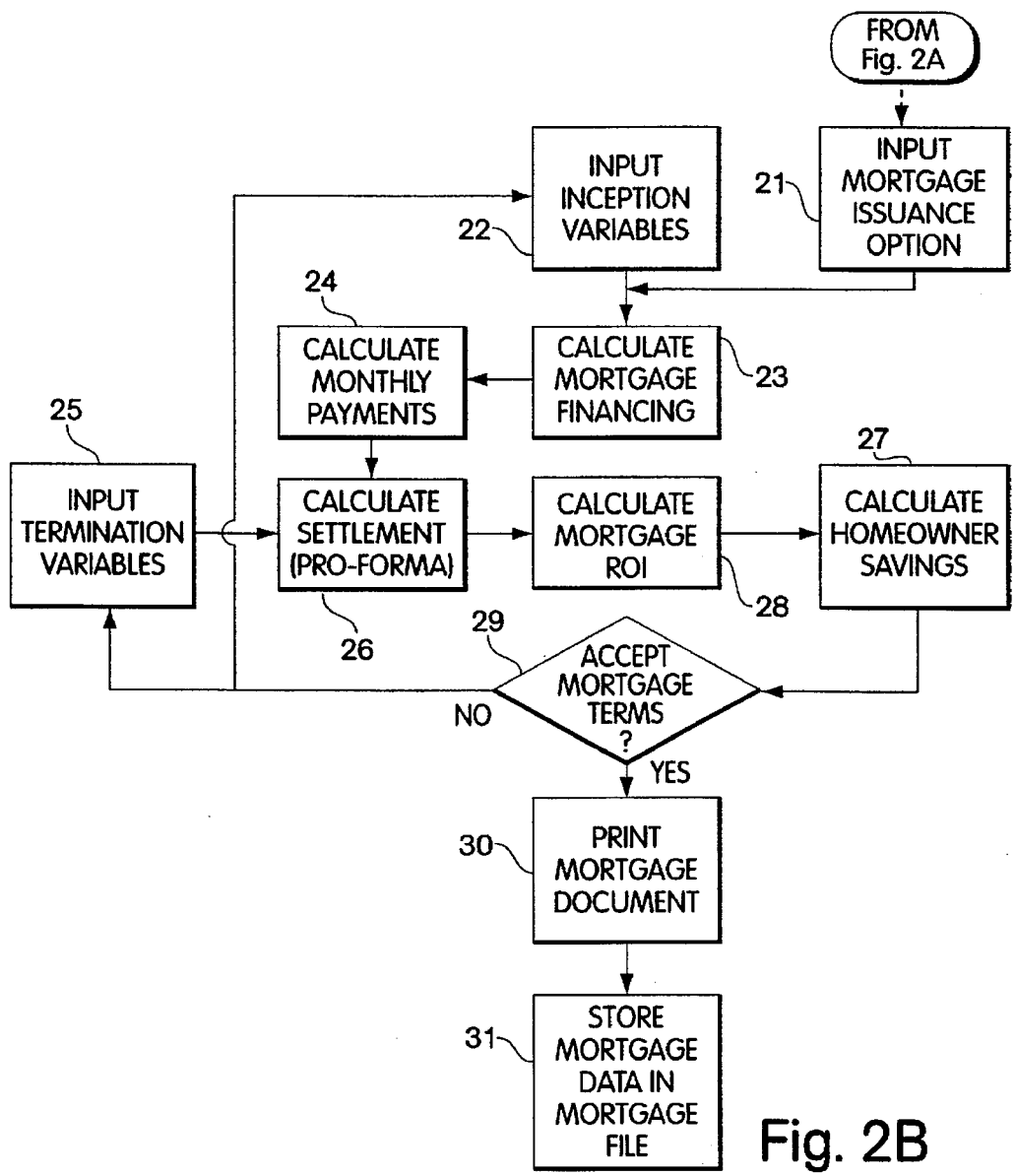

In the origination process as described at 21 in FIG. 2B, data source 1 (originator) applies the data as per Table 1(Issuer Input Variables) and computer system through a computer interface unit 2 and to its memory 3. The following data from prospective homeowners or mortgagors are then input by originator via 5 at 22: house purchase price (aa), actual down payment percent provided by homeowner (ab), and the current house price index in the locality of the house (ac).

Once the originator has completed the input on potential mortgage originations at 21, the data processor at 4 and mortgage system at 23 and 24 in FIG. 2B transforms the combination of Issuer and Inception Input Variables into Inception Output Variables. These can also be displayed at 5 and printed at 7. If the terms are accepted, the computer system also prints the mortgage instrument at 30.

The total financing at 23 is calculated by first assessing an optional fee (ar), if any, using a percentage times the total mortgagee financing as follows. Homeowner financing (au) is calculated as the higher of the minimum required percent or the percentage made available by the homeowner. The Section B financing share (at) is calculated as a percent of the total purchase price (aa). Section A financing (aq) is the residual of the total purchase price, plus the mortgage fee, less homeowner and Section B financing.

At 24 the system calculates the monthly payments made by the homeowner under Section A (which commence one month after inception through the close of the Section A term), and Section B (which are paid commencing one month after Section A termination through close of the stated instrument term). These payments are the result of a function, PMT as defined at the end of Table 1. This function determines the monthly payments for Section A (av) and Section B (aw) required to amortize their respective initial debt obligations of as and at, using respective interest rates of t and w, to zero balances at the end of their respective payment periods of r and s.

At this time, prospective homeowners would also want Termination Input Variables entered at 25 on a pro-forma basis to assess the results of termination or settlement of obligations under several different termination conditions. These conditions include the pro-forma month of termination (bb), pro-forma house price index at such time (ba) and the pro-forma proceeds from sale (be). The computer system at 26 then calculates settlement as further described in FIG. 3 and as follows.

Origination Input Variables as already input at 61 are combined with the Input Termination Variables at 62. At 63 the Net Value (by) is calculated by first determining the Gross Value (bu). This is the ratio (bt) of house price index at pro-forma termination over that at inception times house purchase price. The Gross Value is then reduced by the Selling Allowance. The Net House Value is then used at 64 as the basis for equity sharing as between homeowner and Section B.

At 64 the value for equity sharing between Section B and the homeowner is first determined by calculating the remaining Section A and B debt principal obligations (br and bq respectively) by subtracting the amortized reduction of these balances (bp and bq) from the original amounts. The Net Equity for Sharing (bw) is the Net House Value as above less the remaining principal obligations. The preliminary Section B JVP and homeowner equity is preliminarily calculated as bx and bz, using their respective equity percents. At 65 the Section A and B obligations are then calculated. At 66 for Section A this is the principal balance at pro-forma termination as calculated above. For Section B it is the sum (by) of the Section B principal obligation and Section B's JVP share.

The actual distribution of proceeds on sale am subject to two tests at 67 and 69. The first test is whether the pro-forma proceeds upon sale (be) exceed the obligations owing to Section A and B as calculated above. If they do, complete distribution of obligated amounts is available to Section A and B as per cf and cg. If not (as in the case of loss on foreclosure), the proceeds and loss are shared on a pro-rata basis between Section A and B in proportion (ca and cb) to their obligated balances at 68A and 68B. The Section B obligated balance is then subject to an additional test at 69 to insure that early termination does not provide an excessive return to the Section B mortgagee. If the pro-forma termination is within the cap period and the amount of cg exceeds the cap percent over the pro-forma term of the loan, ch is the result of any such excess. This is reduced from cg to produce the final Section B amount for distribution (ci) at 70.

A final step of pro-forma settlement at 27 in FIG. 2 is the calculation of the future value of homeowner Net Equity Value (cu) at termination. This is the sum of homeowner distribution of remaining proceeds after paying Section A and B (bzz and ch) and the future value of homeowner savings in monthly payments versus a conventional loan (cs). The latter is determined by assuming the homeowner would have a conventional monthly loan payment of cp under assumptions of borrowing the entire mortgage principal (i.e., Section A and B amounts) at the Section A interest rate. It also includes the effect of compounding the homeowner's monthly savings under the assumption that he or she invests it at the Section A interest rate.

Also showed as part of the origination process at 28, but not shared with prospective homeowners, is a calculation of the Section A and B return on initial investments or financing (cn and co respectively). This is the percent which discounts the future value of Section A and B distributed amounts at termination to their respective financing amounts at inception using the RATE function as defined at the end of Table 1.

If the homeowner accepts the terms of the mortgage at 29, the mortgage is printed at 7 and 30 and stored in the file of outstanding mortgages at 31 for servicing.

Table 2 shows a calculation of settlement using the sample variables per Table 1. Block 53 FIG. 2D is a summary of the settlement calculation process. As noted, 51 is the pro-forma input of Termination Input Variables as pan of the pro-forma settlement process. 52 is the input of the actual mortgage balances from the file of outstanding mortgages, using actual Termination Input Variables to determine actual settlement. As such, the Table 1 sample data and Table 2 sample output as produced per 54 can be viewed as both a calculation of actual and pro-forma settlement.

Figure 2C:
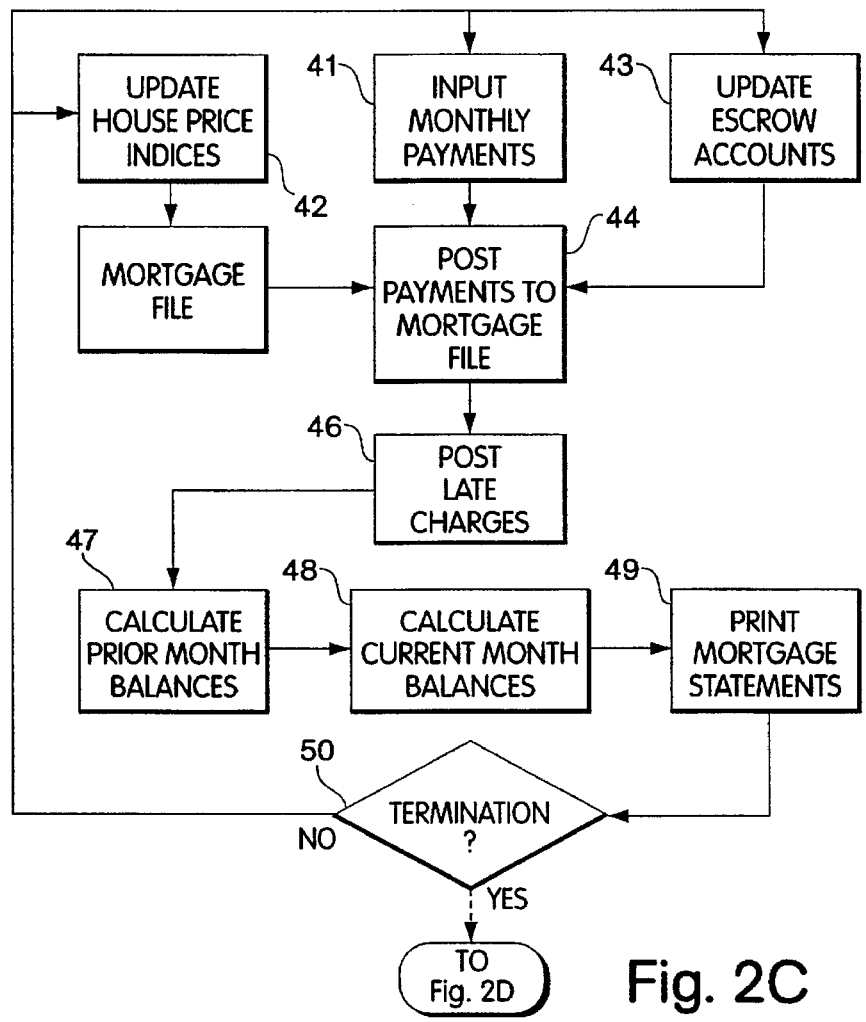
Figure 2D:
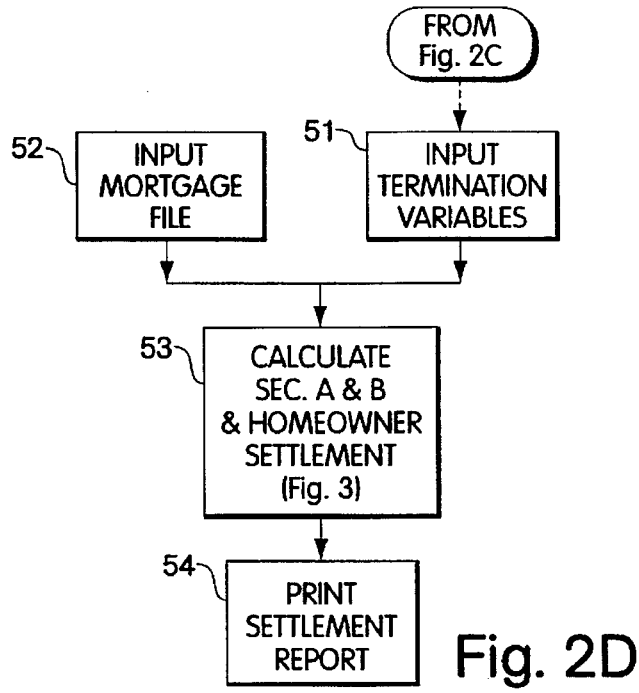

After ofigination and before actual settlement of mortgage obligations, mortgages are serviced as per FIG. 2C by inputting such balances at 45 from storage media 6 into data processor 4. These balances are the respective outstanding Section A and B debt obligations (br1 and bs1) from prior periods, which are updated from 1 into interface unit 2 and memory 3 each month by homeowner payments (eu) at 44. Note that the homeowner payments reflect the actual Section A or Section B amount owing at the time of payment. This is the sum of any escrow payments to be withheld (db) at 43 and any late charges (dc) at 46 added to either the Section A or Section B outstanding debt obligations owing. The latter is tested in eu based on the time of payment (bb).

Until termination is initiated at 50, a monthly mortgage statement is calculated at 47 and 48 and produced by the system at 49 via printer 7. The monthly mortgage statement employs the same settlement calculations of FIG. 3. As such, the system calculates another pro-forma settlement as of the date of the statement with the following modifications. First of all, the statement as shown in Table 3 reflects two sets of settlement balances, those calculated as of the beginning of the current statement period and those calculated as of the end of the current statement period. These are differentiated by reference to the Statement Output Variables of Table 1. Variable abbreviations suffixed with the number "1" represent the same results and calculations as the corresponding Settlement Output Variables. However, the latter represent the mounts as of the beginning of the current month (or end of prior month), while the latter are the amounts at the end of the period.

Note also that house price indices ba are input periodically, but not necessarily monthly, at 42. Since the Bureau of Census House Price Indices are only available on a quarterly basis, the system uses currently available indices in calculating monthly increases in those indices above. In addition, since there is no sale or actual proceeds from sale (bc), this is equated to bv for the purposes of calculating Section A, Section B and homeowner balances.

Wherever within this specification and appended claims specific terms such as length of time, interest percentages, points paid, percentages or mounts of division between Section A and Section B (mortgagees), mount of mortgagor down payment or percentage equity share division between mortgagor and Section B mortgagee, or references to total length of both parts of first mortgage, such references shall be understood to be examples only and not generic to, nor limits upon, the process of and method for which patent coverage is here being sought.

While particular embodiments of the present invention have been shown and described, it is apparent, especially from the preceding paragraph, that changes and modifications may be made without departing from this invention in its broader aspects, and, therefore, the aim in the appended claims is to cover all such changes and modifications as fall within the true spirit and scope of the invention:

Moreover, while this specification and appended claims also references the application of the invention to purchase of homeowner dwellings, the intended application of the invention is not limited thereto, but additionally applies to the acquisition of all forms of real property through multi-part mortgage instruments with equity sharing as herein described.

TABLE 1

Input and Output Variables Used in Mortgage System

| Variables | Example | Definition | Calculations |
|---|---|---|---|
| | | Issuer Input Variables | |
| a | 20 | Total length of entire mortgage in Years from Inception | |
| b | 15 | Total length in Years of Section A mortgage part from Inception | |
| c | 25.00% | Percent of Financing of Gross House Value (GHV) by Section B | |
| d | 25.00% | Minimum down payment percent (of GHV) required of homeowner | |
| e | 10.00% | Annual interest rate in Calculating Section A payments | |
| f | 0.00% | Annual Sect. B rate premium (or discount) over that of Sect. B | |
| g | 50.00% | Percent of Section B's Joint Venture Equity interest in GHV | |
| h | 36 | Maximum Years from inception within which a limit or Cap on the Section B Return On Investment (ROI) applies | |
| i | 1.24% | Monthly RoI percentage Cap | |
| j | 6.00% | Percentage Selling Commission Allowance on Gross House Value at Termination to produce Net House Value | |
| k | 0.75% | A Fee or charge (if any) assessed to originate mortgage as percent of total mortgage financing | |
| | | Issuer Output Variables | |
| P | 5 | Total length in years of Section B mortgage part, with payments payments beginning after termination of Section A | $p = a - b$ |
| q | 240 | Total length of entire mortgage in months | $q = a * 12$ |
| r | 180 | Total length in months of Section A mortgage part from Inception | $r = b * 12$ |
| s | 60 | Total length in months of Section B mortgage repayment period | $s = p * 12$ |
| t | 0.83% | Monthly interest rate for calculating Section A payments | $t = e/12$ |
| u | 10.47% | Annualized Effective Interest Rate in calcul. Sect. A payments | $u = (1 + t)^{12} - 1$ |
| v | 10.00% | Annual Interest Rate in calculating Section B payments | $v = e + f$ |
| w | 0.83% | Monthly interest rate for calculating Section B payments | $w = v/12$ |
| x | 10.47% | Annualized Effective Interest Rate in calcul. Sec. B payments | $x = (1 + w)^{12} - 1$ |
| | | Inception Input Variables | |
| aa | $ 100.000 | Gross House Value (GHV) or purchase price at inception | |
| ab | 25.00% | Actual down payment percent (of GHV) requested by homeowner | |
| ac | 100.00 | House Price Index in house locality at Inception | |
| | | Inception Output Variables | |
| ap | 100,562.50 | Total amount required in financing house purchase (at Inception) | $ap = aa + ar$ |
| aq | 50,000.00 | Total purchase price financed by Section A (at Inception) | $aq = aa - at - au$ |
| ar | 562.50 | Amount of fee assessed (if any) on total mortgage financing | $ar = k * (at + aq)$ |
| as | 50,562.50 | Total amount of debt financed by Section A (at Inception) | $as = aq + ar$ |
| at | 25,000.00 | Total mount of debt financed by Section B (at Inception) | $at = c * aa$ |
| au | 25,000.00 | Homeowner Financing or actual down payment | $au = (>of\ ab\ OR\ d) * aa$ |
| av | 543.35 | Monthly Section A mortgage payment, commencing one month after inception, at montly interest rate, sufficient to pay off Total Section A debt over payment period | $av = PMT(as, t, r)$ |
| aw | 531.18 | Monthly Section B mortgage payment, commencing one month after Sect. A termination, at monthly interest rate, sufficient to pay off Total Section A debt over payment period | $aw = PMT(at, w, s)$ |
| | | Termination Input Variables | |
| ba | 171.8186 | House Price Index in house locality at Termination | |
| bb | 96.00 | Total length in months of mortgage fro mInception to Termination | |
| bc | 161,509.50 | Net (of actual selling expenses) proceeds (in foreclosure) or sale of house at termination | |

TABLE 1-continued

Input and Output Variables Used in Mortgage System

| Variables | Example | Definition | Calculations |
|---|---|---|---|
| | | *Termination Output Variables* | |
| bp | (17,833.07) | Reduction in original balance of Section A debt at Termination | bp = (−IF bb <= r: as − PV (av ,t,r − bb), else: as) |
| bq | 0.00 | Reduction in original balance of Section B debt at Termination | bq = (−IF bb <= r: 0, else: at − PV(aw, w ,q − bb) |
| br | 32,729.43 | Debt obligation to Section A at Termination | br = as + bp |
| bs | 25,000.00 | Debt obligation to Section B at Termination | bs = at + bq |
| bt | 1.7182 | Ratio of House Price Index at Termination over Inception | bt = ba / ac |
| bu | 171,818.62 | Gross House Value at Termination as measured by Index | bu = aa * bt |
| bv | 161,509.50 | Net indexed House Value at Termination after Selling Allowance | bv = bu * (1 − j) |
| bw | 103,780.08 | Net Equity available for equity sharing | bw = bv − br − bs |
| bx | 51,890.04 | Section B Joint Venture Equity amount at Termination | bx = g * bw |
| by | 76,890.04 | Preliminary homeowner obligation to Section B at Termination | by = bs + bx |
| bz | 51,890.04 | Preliminary homeowner distribution before loss test at termin. | bz = bc − bx − br − bs |
| bzz | 51,890.04 | Homeowner Distribution at Termination | bzz = IF(bz <0: 0, bz) |
| ca | 29.86% | Percentage of Sect. A to total mortgagee obligations | ca = br/(br + by) |
| cb | 70.14% | Percentage of Sect. B to total mortgagee obligations | cb = b7/(by + br) |
| cd | 0.00 | Pro-rata Distribution of Loss on Proceeds (vs total of Sect. A and B obligated amounts) as reduction to obligation to Sect. A in proportino to total Sect. A and B obligations | cd = (IF bz <0: ca * bz, else: 0) |
| ce | 0.00 | Pro-rata Distribution of Loss on Proceeds (vs total of Sect. B and B obligated amounts) as reduction to obligation to Sect. B in proportion to total Sect. A and B obligations | ce = (F bz <0: cb * bz), else: 0) |
| cf | 32,729.43 | Amount of Distribution to Section A upon Termination of mortgage | cf = br + cd |
| cg | 76,890.04 | Amount for Sec. B Distribution at Termination prior to cap test | cg = by + ce |
| ch | 0.00 | Escess per mortgage of actual Sect. B Investment return over cap | ch =(IF bb <= h & at *(i + i) ^bb < cg: cg − at * (1 + i) bb, else: 0) |
| ci | 76,890.04 | Amount of distribution to Section B upon Termination of mortgage | ci = cg − ch |
| cj | 112,156.51 | Future Value (at Termination) of all payments to Sect. A on mortgage from Inception to Termination | cj = as * (1 + t)^bb − cd |
| ck | 76,890.04 | Future Value (at Termination) of all payments to Sect. B on mortgage from Inception to Termination | ck = If (bb < r: ci, else: at * (1 + w)^(bb − r) + ci − ba) |
| cn | 10.47% | Actual Section A Return On Investment from Incept. to Termination | cn = (1 + (RATE(cj, as, bb))^12 − 1 |
| co | 15.08% | Actual Section B Return On Investment from Incept. to Termination | co = (1 +(RATE(ck, at, bb))^12 − 1 |
| cp | 723.77 | Monthly payment by Homeowner of Conventional mortgage of same duration and Section A interest rate | cp = PMT(aq + at,t,q) |
| cq | 180.42 | Monthly Saving in Section A monthly payment vs. conventional loan | cq = cp − av |
| cr | 192.59 | Monthly Saving in Section B monthly payment vs. conventional laoN | cr = cp − aw |
| cs | 26,373.85 | Future Value at Termination of monthly savings in Section A & B payments vs. conventional Loan | cs = IF(bb <= r: FV(cq, t, bb), else: FV(cq, t, r)*(1 + t)^(bb − r) + FV(cr, t, bb−r) |
| cu | 78,263.88 | Homeowner's Net Equity value: monthly savings and house equity: at Termination | cu = cs + bzz + ch |
| cv | 10,309.12 | Value of unused Selling Allowance to homeowner | cv = j * bu |
| cw | 88,573.00 | Gross Value of homeowner equity plus savings in monthly payments | cw = cu + cv |
| | | *Statement Input Variables* | |
| db | 0.00 | Current month payment: escrow portion | |
| dc | 0.00 | Current month payment: late charge | |
| | | *Statement Output Variables* | |
| ba1 | 170.8526 | House Price Index in house locality: One month prior | ba1 = (1 + 1)^((bb−1)/12)*100 |
| bc1 | 160,601.44 | Net (of actual selling expenses) proceeds (in Foreclosure) or sale of house at termination | bc1 = aa * bt1 * (1 − j) |
| bp1 | (17,564.71) | Reduction in original balance of Section A debt: One month prior | bp1 = −(IF bb <= r: as − PV(av ,t, r − bb+1), else: as) |
| bq1 | 0.00 | Reduction in original balance of Section B debt: One month prior | bq1 = −(IF bb <= r:0, else: at − PV(aw, w ,q − bb+1) |
| br1 | 32,997.79 | Debt obligation to Section A: One month prior | br1 = as + bp1 |
| bs1 | 25,000.00 | Debt obligation to Section B: One month prior | bs1 = at + bq1 |
| bt1 | 1.7085 | Ratio of House Price Index: One month prior over Inception | bt1 = ba1/ac |
| bu1 | 170,852.59 | Gross House Value as measured by Index: One month prior | bu1 = aa * bt1 |
| bv1 | 160,601.44 | Net indexed House Value after Selling Allowance: One month prior | bv1 = bu1 *( (1 − j) |
| bw1 | 102,603.65 | Net House Value available for equity sharing: One month prior | bw1 = bv1 − br1 − bs1 |
| bx1 | 51,301.82 | Section B Joint Venture equity amount: One month prior | bx1 = g * bw1 |
| by1 | 76,890.04 | Preliminary homeowner obligation to Section B: One month prior | by1 = bsw1 + bx1 |
| bz1 | 51,301.82 | Preliminary homeowner distrib. before loss test: One month prior | bz1 = bc1 − bx1 − br1 − bs1 |
| cf1 | 32,997.79 | Amount of distribution to Section A: One month priro | cf1 = br1 |
| cg1 | 76,301.82 | Amount for Sec. B distribution prior to cap test: One month prior | cg1= by1 |

TABLE 1-continued

Input and Output Variables Used in Mortgage System

| Variables | Example | Definition | Calculations |
|---|---|---|---|
| ch1 | 0.00 | Excess per mortgage of actual Sect. B Investment return over cap: One month prior | ch1 = (IF bb–1 <= h & at * (i + i)^(bb–1) < cg1: cg1 – at * (1 + i)^(bb–1), else: 0) |
| ci1 | 76,301.82 | Amount of Distribution to Section B: One month prior | ci1 = cg1 – ch1 |
| cj1 | 11,229.59 | Future Value of all payments to Sect. A on mortgage from Inception to One month prior | cj1 = as * (1 + t)^(bb–1) |
| ck1 | 76,301.82 | Future Value of all payments to Sect. B on mortgage from Inception to One month prior | ck1 = If(bb–1 < r: ci1, else: at * (1 + w)^(bb –1–r) + ci1 – bs1 |
| cn1 | 10.47% | Actual Section A ROI from Incept. to One month prior | cn1 = (1 + (RATE(cj1, as, bb–1))^12 – 1 |
| co1 | 15.14% | Actual Section B ROI from Incept. to One month prior | co1 = (1 + (RATE(ck1, at, bb–1))^12 – 1 |
| cp1 | 723.77 | Monthly payment by homeowner of conventional mortgage of same duration and Section A interest rate | cp1 = PMT(aq + at, t, q) |
| cq1 | 180.42 | Monthly Saving in Section A monthly payment vs conventional loan | cq1 = cp1 – av |
| cr1 | 192.59 | Monthly saving in Section B monthly payment vs conventional loan | cr1 = cp1 – aw |
| cs1 | 25,976.95 | Future Value of monthly savings in Section A & B payments vs. conventional Loan: One month prior | cs1 = IF(bb–1 <= r: FV(cq1, t, r), else: FV(cq1, t, r)*(1+t)^(bb–r–1)+ FV (cr1, t, bb–r–1)) |
| cu1 | 77,278.78 | Homeowner's Net Equity value: monthly savings and house equity: One month prior | cu1 = cs1 + bz1 + ch1 |
| cv1 | 10,251.16 | Value of Unused Selling Allowance to homeowner: One month prior | cv1 = j * bu1 |
| cw1 | 87,529.93 | Gross Value of homeowner equity plus savings in monthly payments: One month prior | cw1 = cu1 + cv1 |
| eu | 543.35 | Current Monthly Payment Due: Section A or Section B Amount | eu = IF(bb <= r: fc, else: fj) |
| ev | 180.42 | Monthly Cash Savings re Conventinal Loan | ev = IF(bb <= r: cq, else: cr) |
| ew | 10.00% | Interest Factor: Section A or Section B annual percent | ew = IF(bb <= r: e, else: v) |
| fa | 268.37 | Current Month Section A Payment: Principal portion | fa = IF(bb <= r: –bp + bp12, else: 0) |
| fb | 274.98 | Current Month Section A Payment: Interest portion | fb = IF(bb <= r: +av –fs, else: 0) |
| fc | 543.35 | Current Month Section A Payment: Total payment | et = IF(bb <= r: fa + fb + db + dc, else: 0) |
| fh | 0.00 | Current Month Section B Payment: Principal portion | fh = IF(bb > r: –bq + bq1, else: 0) |
| fi | 0.00 | Current Month Section B Payment: Interest portion | fi = IF (bb > r: aw – fh, else: 0) |
| fj | 0.00 | Current Month Section B Payment: Total payment | fj = IF(bb > r: fh + fi + db + dc, else: 0) |
| g | 109,887.83 | Total unpaid homeowner obligation | g = ci + fh + fa + br |

Definition of Symbols used in "Calculations" column above
" ^ " means exponentiation
"*" means multiplication
"/" means division
"<" means "less than"
"<=" means "les than or equal to"
">" means "more than"
">=" means "more than or equal to"

Definition of FUNCTIONS used in "Calculation" column above

IF(test, ifyes, ifno): value, which equals formula (ifyes) if condition (test) is true or formula (info) if condition (test) is false:

PMT(principal, interest, term): calculation of the periodic payment of an annuity on a loan, which amortizes amount of loan (principal) to zero balance at end of period (term) at rate of periodic interest (interest):

$$= principal * \frac{interest}{1 - (interest + 1)^{(-term)}}$$

PV(payment, interest, term): the present value of an annuity of payments of equal amount (payment) over a period of time (term), discounted at a rate of interest (interest):

$$= payment * \frac{1 - (1 + interest)^{(-term)}}{interest}$$

FV(payment, interest, term): the future value of an annuity of payments of equal amount (payment) over a period of time (term), discounted at a rate of interest (interest):

$$= payment * \frac{(1 + interest)^{term} - 1}{interest}$$

RATE(future value, present value, term): the interest rate required for an amount (present value) to grow to an amount (future value) at end of time (term) when the interest if compounded at the end of each period during lengtj of time (term):

$$= ((future\ value/present\ value)^{(1/term)}) - 1$$

TABLE 2

Example: Eight Years
Pro-Forma Financing and Actual Settlement
of Joint Venture Partner Mortgage

| Description (A) | Notes (B) | Fee (C) | Value at Termination | | Total Original Financing (F) | Monthly Payments | | Homeowner Equity (I) |
|---|---|---|---|---|---|---|---|---|
| | | | Indexed house Value (D) | Lesser of Act. vs Ind. Value (E) | | Sec. A $543.35 ******* Sec. A (G) | Sec. B $531.18 ******* Sec. B (H) | |
| 1. House Price & Financing: | | | | | $100,000 | $50,000 | $25,000 | $25,000 |
| 2. Fee: | | $563 | | | 563 | 563 | | |
| 3. Financing & Debt at Inception: | | $563 | | | $100,563 | $50,563 | $25,000 | $25,000 |
| 4. Debt Reduction through Month of Termination: Indexed House Value vs Proceeds at Termination: | 96 | | | | | (17,833) | 0 | |
| 5. Ratio of Term./Inception HPI: | 1.72 | | $171,819 | | | | | |
| 6. Selling Cost Allowance %: | 6.00% | | (10,309) | | | | | |
| 7. Indexed Value vs Proceeds: | | | $161,510 | $161,510 | | | | |
| 8. Debt at Termination: | | | (57,729) | (57,729) | | $32,729 | $25,000 | |
| 9. Net Indexed Value: | | | $103,780 | | | | | |
| 10. Section B Equity Share: | 50.00% | | (51,890) | (51,890) | | | 51,890 | |
| 11. Debt Repayment & Equity Distrib.: | | | $51,890 | $51,890 | | $32,729 | $76,890 | |
| 12. Sect. A Distr. of Forecl. Loss: | 29.86% | | | 0 | | 0 | 0 | |
| 13. Sect. B Distr. of Forecl. Loss: | 70.14% | | | 0 | | | 0 | |
| 14. Homeowner Equity Distribution: | | | | (51,890) | | | | 51,890 |
| 15. Total Distr. of Sale Proceeds: | | | | $0 | | $32,729 | $76,890 | $51,890 |
| 16. Reduction in Sect B by Amount Greater than Cap within Cap Per.: | | | | | | | 0 | 0 |
| 17. Future Value of HO Savings on Mon. Payments (vs Conv. Loan): | | | | | | | | 26,374 |
| 18. Net Overall Value at Termination: | | | | | | | | $78,264 |
| 19. Future Value of all Mortgagee Distributions at Termination: | | | | | | $112,157 | $76,890 | |
| 20. Mortgagee Financing at Inception: | | | | | | 50,563 | 25,000 | |
| | | | | | | = | = | |
| 21. Averge Mortgagee % Return on Investment from Inception to Termination: | | | | | | 10.47% | 15.08% | |

TABLE 2A

Example: Eight Years
Pro-Forma Financing and Actual Settlement
of Joint Venture Partner Mortgage

| Description (A) | Notes (B) | Fee (C) | Value at Termination | | Total Original Financing (F) | Monthly Payments | | Homeowner Equity (I) |
|---|---|---|---|---|---|---|---|---|
| | | | Indexed house Value (D) | Lesser of Act. vs Ind. Value (E) | | Sec. A av ******* Sec. A (G) | Sec. B aw ******* Sec. B (H) | |
| 1. House Price & Financing: | | | | | aa | aq | at | au |
| 2. Fee: | | ar | | | ar | ar | | |
| 3. Financing & Debt at Inception: | | ar | | | ap | as | at | au |

TABLE 2A-continued

Example: Eight Years
Pro-Forma Financing and Actual Settlement
of Joint Venture Partner Mortgage

| | | | Value at Termination | | | Monthly Payments | | |
| | | | | | | Sec. A | Sec. B | |
| Description (A) | Notes (B) | Fee (C) | Indexed house Value (D) | Lesser of Act. vs Ind. Value (E) | Total Original Financing (F) | av ******* Sec. A (G) | aw ******* Sec. B (H) | Homeowner Equity (I) |
|---|---|---|---|---|---|---|---|---|
| 4. Debt Reduction through Month | bb | | | | | bp | bq | |
| of Termination: Indexed House Value vs Proceeds at Termination: | | | | | | | | |
| 5. Ratio of Term./Inception HPI: | bt | | bu | | | | | |
| 6. Selling Cost Allowance %: | j | | bv − bu | | | | | |
| 7. Indexed Value vs Proceeds: | | | bv | bc | | | | |
| 8. Debt at Termination: | | | −br − bs | −br − bs | | br | bs | |
| 9. Net Indexed Value: | | | bw | | | | | |
| 10. Section B Equity Share: | | g | −bx | −bx | | | bx | |
| 11. Debt Repayment & Equity Distrib.: | | | bw*(1 −g) | bz | | br | by | |
| 12. Sect. A Distr. of Forecl. Loss: | ca | | | −cd | | cd | | |
| 13. Sect. B Distr. of Forecl. Loss: | cb | | | −ce | | | ce | |
| 14. Homeowner Equity Distribution: | | | | −bzz | | | | bzz |
| 15. Total Distr. of Sale Proceeds: | | | | 0 | | cf | cg | bzz |
| 16. Reduction in Sect B by Amount Greater than Cap within Cap Per.: | | | | | | | −ch | ch |
| 17. Future Value of HO Savings on Mon. | | | | | | | | cs |
| Payments (vs Conv. Loan): | | | | | | | | |
| 18. Net Overall Value at Termination: | | | | | | | | cu |
| 19. Future Value of all Mortgagee Distributions at Termination: | | | | | | cj | ck | |
| 20. Mortgagee Financing at Inception: | | | | | | as | at | |
| | | | | | | = | = | |
| 21. Average Mortgagee % Return on | | | | | | cn | co | |
| Investment from Inception to Termination: | | | | | | | | |

TABLE 3

Example: Eight Years
Monthly Mortgage Statement

| Payment Date | Date | | | | |
|---|---|---|---|---|---|
| 1. Latest Payment Date: | 01-Jul-97 | | | | |
| 2. Due Date: | 15-Jul-97 | | | | |

| Total Financing & House Values (A) | Line References (B) | Prior Period (C) | Amount Owed (D) | Period Change (E) | $100,000.00 Period (F) |
|---|---|---|---|---|---|
| 3. Total Original Borrowing: | | $ 75,562.50 | | | $100,000.00 |
| 4. Original House Price: | | $100,000.00 | | | |
| 5. Ratio of House Price Index: | | 1.7085 | | | 1.7182 |
| 6. Value of Home per House Price Index: | 4 * 5 | $170,852.59 | | $966.03 | $171,818.62 |
| 7. Selling Allowance: | | (10,251.16) | | (57.96) | (10,309.12) |
| 8. Net House Value: | 6 − 7 | $160,601.44 | | $908.06 | $161,509.50 |
| 9. Escrow: | | | 0.00 | | |
| 10. Late Charge: | | | 0.00 | | |

Section A

TABLE 3-continued

Example: Eight Years
Monthly Mortgage Statement

| | | | | | |
|---|---|---|---|---|---|
| 11. Original Borrowing: | | 50,562.50 | | | |
| 12. Principal Balance: | | $ 32,997.79 | 268.37 | (268.37) | $ 32,729.43 |
| 13. Interest Payment Due: | | | 274.98 | | |
| | Section B | | | | |
| 14. Original Borrowing: | | $ 25,000.00 | | | |
| 15. Principal Balance: | | $ 25,000.00 | 0.00 | 0.00 | $ 25,000.00 |
| 16. JVP Equity Share: | | 51,301,82 | | 588.21 | 41,890.04 |
| 17. Reduction of Excess over Cap: | | 0.00 | | 0.00 | 0.00 |
| 18. Ttoal Section B Balance: | 15 + 16 | $ 76,301.82 | | $ 588.21 | $ 76,890.04 |
| 19. Interest Payment Due: | | | 0.00 | | |
| 20. Total Monthly Payment Due: | | | $ 543.35 | | |
| 21. Unpaid Principal Reduction | 12 | | (268.37) | | 268.37 |
| 22. Total Homeowner Obligation: | 12 + 17 + 20 | | | | $109,887.83 |
| | Homeowner | | | | |
| 23. Original Equity: | | $ 25,000.00 | | | |
| 24. Monthly Cash Savings: | | | | | $ 180.42 |
| 25. Interest Factor: | | | | | 10.00% |
| 26. PV of Accumulated Savings: | | $ 25,976.95 | | 396.89 | $ 26,373.85 |
| 27. Homeowner Equity Distribution | 16 | $ 51,301.82 | | 588.21 | $ 51,890.04 |
| 28. Distribution of Excess over Cap: | 17 | 0.00 | | 0.00 | 0.00 |
| 29. Borrower's Net Equity Share: | 25 + 26 + 27 | $ 77,278.78 | | $ 985.11 | $ 78,263.88 |
| 30. Unused Selling Allowance: | 7 | 10,251.16 | | 57.96 | 10,309.12 |
| 31. Borrower's Gross Equity Share: | 28 + 29 | $ 87,529.93 | | $1,043.07 | $ 88,573.00 |

TABLE 3A

Monthly Mortage Statement

| Payment Data | Date | | | | |
|---|---|---|---|---|---|
| 1. Latest Payment Date: | 01-Jul-97 | | | | |
| 2. Due Date: | 15-Jul-97 | | | | |

| Total Financing & House Values (A) | Line References (B) | Prior Period (C) | Amount Owed (D) | Period Change (E) | Current Period (F) |
|---|---|---|---|---|---|
| 3. Total Original Borrowing: | | as + at | | | |
| 4. Original House Price: | | as | | | as |
| 5. Ratio of House Price Index: | | bt1 | | | bt |
| 6. Value of Home per House Price Index: | 4 * 5 | bu1 | | bu − bu1 | bu |
| 7. Selling Allowance: | | −cv1 | | cv1 − cv | −cv |
| 8. Net House Value: | 6 − 7 | bv1 | | bv − bv1 | bv |
| 9. Escrow: | | | db | | |
| 10. Late Charge: | | | dc | | |
| | Section A | | | | |
| 11. Original Borrowing: | | as | | | |
| 12. Principal Balance: | | Br1 | fa | br − br1 | br |
| 13. Interest Payment Due: | | | fb | | |
| | Section B | | | | |
| 14. Original Borrowing: | | at | | | |
| 15. Principal Balance: | | bs1 | fh | bs − bs1 | bs |
| 16. JVP Equity Share: | | bx1 | | bx − bx1 | bx |
| 17. Reduction of Excess over Cap: | | −ch1 | | ch1 − ch | −ch |
| 18. Total Section B Balance: | 15 + 16 | ci1 | | ci − ci1 | ci |
| 19. Interest Payment Due: | | | fi | | |
| 20. Total Monthly Payment Due: | | | eu | | |
| 21. Unpaid Principal Reduction | 12 | | fh − fa | | fh + fa |

TABLE 3A-continued

| Monthly Mortage Statement | | | | |
|---|---|---|---|---|
| 22. Total Homeowner Obligation: | 12 + 17 + 20 | | | f |
| | Homeowner | | | |
| 23. Original Equity: | | au | | |
| 24. Monthly Cash Savings: | | | ev | |
| 25. Interest Factor: | | | | ew |
| 26. PV of Accumulated Savings: | | cs1 | cs − cs1 | cs |
| 27. Homeowner Equity Distribution | 16 | bz1 | bz − bz1 | bz |
| 28. Distribution of Excess over Cap: | 17 | ch1 | ch − ch1 | ch |
| 29. Borrower's Net Equity Share: | 25 + 26 + 27 | cu1 | cu − cu1 | cu |
| 30. Unused Selling Allowance: | 7 | cv1 | cv − cv1 | cv |
| 31. Borrower's Gross Equity Share: | 28 + 29 | cw1 | cw − cw1 | cw |

What is claimed is:

1. A method, with the aid of a digital computer system including a printer, of preparing single-issue, multi-part mortgage documents wherein the multiple payment obligations of mortgagor to multiple mortgagees under said parts varies as to term of each obligation and the amount and timing of the repayment of such obligations to each mortgagee, said method comprising the steps of:

(a) applying data from issuer regarding the terms of multi-part mortgage obligations into the digital computer, (b) acquiring customer identifications from potential mortgagors as to financing requirements and options;

(c) applying the acquired identifications into the digital computer, (d) storing the acquired data and identifications in the digital computer, (e) actuating the digital computer to calculate mortgage obligations and terms from the acquired data and identifications;

(f) actuating the digital computer to print the mortgage document using the acquired data and identifications.

2. A method as in claim 1 wherein said mortgage document also contains a cross-default provision as between each mortgagee and where such provision provides, with the aid of a digital computer, for payment to each mortgagee a pro-rata share of any collateral based on the respective outstanding or unpaid obligations to each mortgagee as defined in the mortgage instrument.

3. A method, with the aid of a digital computer system including a printer, of preparing mortgage documents which provide for mortgagee to share an equity interest in the value of the real property subject to the mortgage in exchange for funds provided by mortgagee to mortgagor in order to acquire title in such real property, said method comprising the steps of:

(a) applying data from issuer regarding the terms of equity shares of mortgage obligations into the digital computer;

(b) acquiring customer identifications from potential mortgagors as to financing requirements and options;

(c) applying the acquired identifications into the digital computer;

(d) storing the acquired data and identifications in the digital computer;

(e) actuating the digital computer to calculate mortgage obligations and terms from the acquired data and identifications;

(f) actuating the digital computer to print the mortgage document using the acquired data and identifications; and (g) from time to time actuating the digital computer for calculating the equity interest in the value of the real property by multiplying an original value of said property by a generally available house price index, as a proxy for the value and changes in such value of such property, and printing the results of said calculation.

4. A method as in claim 3 wherein the house price index is the Bureau of Census Price Index of New One-Family Houses Sold (by region).

5. A method as in claim 3 wherein the equity interest in the value of real property is calculated by:

(a) dividing the ratio of the house price index at the termination of the mortgage by the same index at inception;

(b) multiplying the ratio in (a) by the original purchase price of the house to obtain the gross house value at termination;

(c) subtracting mortgagee debt obligations from the gross house value in (b) to determine the net value for equity sharing;

(d) multiplying the net amount in (c) by a fixed equity sharing percent to determine the amount of the mortgagee equity interest.

6. A method as in claim 5 wherein the calculation of the value of the equity interest of mortgagee includes a selling cost allowance as a percentage reduction to the gross house value in (b) to determine a net house value at termination after allowance for selling costs before determining the net value for equity sharing in (c).

7. A method, with the aid of a digital computer system including a printer, of preparing single-issue, multi-part mortgage documents, wherein the multiple payment obligations of mortgagor to multiple mortgagees under said parts varies as to term of each obligation and the amount and timing of the repayment of such obligations to each mortgagee, and where one or more part or obligation provides for an equity interest in the value of the real property subject to the mortgage, said method comprising the steps of:

(a) applying data from issuer regarding the terms of multi-part mortgage obligations into the digital computer, (b) acquiring customer identifications from potential mortgagors as to financing requirements and options;

(c) applying the acquired identifications into the digital computer, (d) storing the acquired data and identifications in the digital computer, (e) actuating the digital computer to calculate mortgage obligations and terms from the acquired data and identifications;

(f) actuating the digital computer to print the mortgage document using the acquired data and identifications.

8. A method as in claim 7 in which mortgagor payments to reduce a debt obligation on one part of a multi-part mortgage also serve to increase the value of another mortgagee part based on an equity interest in the real property value subject to the mortgage.

9. A method as in claim 7 wherein such method, with the aid of a digital computer, further comprises the steps of:

(a) determining the percentage composition and amounts of mortgage financing for the purchase of real property as between homeowner and multiple mortgagees;

(b) determining monthly mortgagor payment obligations using assumptions of interest rates to be earned over the life of the mortgage on each mortgagee's capital advanced to mortgagor for the purchase of the real property subject to mortgage;

(c) actuating the digital computer to determine, from the amounts in (a) and (b) above, the actual or anticipated investment return on investment for the mortgagee with an equity interest in the value of real property given an equity sharing percent, actual value of the property based on proceeds, anticipated or measured value of such property using an index of house values, the timing and amount of periodic mortgage payments, time of termination, and selling allowances percentage;

(d) actuating the printer to produce report of distribution of proceeds as between mortgagor and mortgagees upon actual or pro-forma termination of the mortgage, where such termination may occur anytime from inception to expiration of the stated term of the instrument.

10. A method as in claim 9 wherein such method, with the aid of a digital computer, further comprises the steps of:

(a) acquiring cash payment data from mortgagors;

(b) acquiring house price index data from available sources;

(c) applying the acquired data in (a) and (b) into the digital computer;, (d) storing the acquired data as per (c) into the digital computer;

(e) actuating the digital computer to calculate the outstanding balances of mortgagor debt obligations and mortgagee debt and equity balances as of the beginning and end of a payment period;

(f) actuating the digital computer to print a statement of said obligations and balances as per (e) above.

11. An apparatus for preparing a single-issue, multi-part mortgage document creating multiple payment obligations of a mortgagor to multiple mortgagees, wherein the obligations vary as to term of each obligation and as to amount and timing of the repayment of such obligations to each mortgagee, and wherein one part is an equity part obligation which provides for a separately marketable mortgage equity interest and which has a corresponding principal, the apparatus comprising:

a non-volatile memory having text data stored in digital form therein, such data representing text portions of each part of the mortgage document;

means for receiving, through a computer interface unit, issuer identification information including the terms of the multi-part mortgage obligations and investment return requirements, and for storing the received issuer identification information in a memory as digital information;

means for receiving, through a computer interface unit, customer identification information from potential mortgagors and data as to financing requirements and options, and for storing received customer identification information in a memory as digital information;

means, responsive to the receipt of issuer and customer identification information, for calculating the amount and timing of repayment information for each obligation, said means for calculating including means for adding any unpaid principal of the equity part obligation and the mortgagee equity interest to obtain the equity part obligation, and for storing the received amount and timing information as digital information in a memory;

means for actuating a printer to print on paper the multi-part mortgage document, including means for selectively retrieving from memory mortgage document text, mortgagor and mortgagee identification information, the amount and timing of repayment information, for each part of the multi-part mortgage document, and for printing the text and information of each part in an order so as to generate said multi-part mortgage document.

12. A data processing system for preparing a single issue multi-part mortgage document creating multiple payment obligations of a mortgage or to multiple mortgagees, wherein the obligations vary as to term of each obligation and as to amount and timing of the repayment of such obligations to each mortgagee, and wherein one part is an equity part obligation which provides for a separately marked mortgagee equity interest and which has a corresponding principle, the data processing system comprising:

a memory having text data stored in digital form therein, such data representing text portions of each part of the mortgage document and having storage locations in which other data may be stored;

a computer interface unit coupled to the memory through which input data may be applied to the data processing system and stored in the memory;

a data processor coupled to the memory and which is capable of performing logical and arithmetic operations on said data;

a printer connected to the data processor for printing said mortgage document; and said data processor comprising:

a) means for prompting a user to input, through the computer interface unit, issue and identification information including the terms of the multi-part obligations and investment return requirements;

b) means for prompting the user to input, through the computer interface unit, customer identification information from potential mortgagors and data as to financing requirements and options;

c) means, responsive to the receipt of issue or in customer identification information, for calculating the amount and timing of repayment information for each obligation said means for calculating including means for adding any remaining principle of the equity part obligation and the mortgagee equity interest to obtain the equity part obligation, and for storing the calculated amount and timing information in the memory; and d) means for actuating the printer to print on paper the multi-part mortgage document, including means for selectively retrieving from memory the mortgage document text, mortgage or mortgagee identification information, the amount and timing of repayment information for each part of the multi-part mortgage document, and for printing the text and information of each part in an order so as to generate said multi-part mortgage document.

13. A method for generating a monthly statement for a single issue, multi-part mortgage document wherein multiple payment obligations of a mortgagor to multiple mortgagees under said parts varies as to term of each obligation and an amount of timing of repayment of such obligations each mortgagee, wherein the mortgagee shares an equity interest in the value of the real property subject to the mortgage in exchange for funds provided by mortgagee to mortgagor in order to acquire a title in such property, the method including the steps of:

(a) calculating mortgage obligations and terms, using a digital computer, based on terms from an issuer of the mortgage, and from customer identifications from potential mortgagors as to financing requirements and options;

(b) periodically
(i) calculating, using a digital computer, new mortgage balances;
(ii) calculating, using a digital computer, the value of the homeowners equity share based on the latest house price indices and
(iii) using the digital computer to activate a printer to print a mortgage statement.

14. A method for terminating a single issue multi-part mortgage document wherein multiple payment obligations of a mortagor to multiple mortgagees under said parts varies as determined of each obligation and an amount of timing of repayment of such obligations to each mortgagee, the mortgagee sharing an equity interest in the value of the real property subject to the mortgage in exchange for funds provided by mortgagee to mortgagor in order to acquire title in such property, wherein one part of the mortgage is an equity part obligation which provides for a separately marketable equity interest, the method including the steps of:

receiving input termination variables, input origination variables and an input mortgage file;

calculating, using a digital computer, a net house value;

calculating, using a digital computer, the remaining equity part obligation;

adding, using a digital computer, the calculated equity share to the debt of the equity part;

comparing using a digital computer the proceeds of the sale to the sum of the equity part obligation and other obligations;

when proceeds from a sale are less than said sum, reducing pro rata the second part obligation and the first part obligation and reducing the equity part obligation by return on investment limits; and using the digital computer to activate a printer to print settlement results.

15. A computer system for preparing single-issue, multi-part mortgage documents wherein the multiple payment obligations of mortgagor to multiple mortgagees under said parts varies as to term of each obligation and the amount and timing of the repayment of such obligations to each mortgagee, said computer system comprising:

(a) a memory for storing data from an issuer regarding the terms of multi-part mortgage obligations, customer identifications from potential mortgagors as to financing requirements and options, (e) means for calculating mortgage obligations and terms from the data and identifications stored in the memory and for storing said obligations and terms in the memory;

(f) a printer having access to said memory and being activatable to print the mortgage document using the data and identifications, and obligations and terms stored in the memory.

16. The system of claim 15 wherein said mortgage document also contains a cross-default provision as between each mortgagee and where such provision provides for payment to each mortgagee a pro-rata share of any collateral based on the respective outstanding or unpaid obligations to each mortgagee as defined in the mortgage instrument, the system further comprising means for determining said pro-rata share.

17. A computer system for preparing mortgage documents which provide for mortgagee to share an equity interest in the value of the real property subject to the mortgage in exchange for funds provided by mortgagee to mortgagor in order to acquire title in such real property, said system comprising:

a memory for storing data from an issuer regarding the terms of equity shares of mortgage obligations and customer identifications from potential mortgagors as to financing requirements and options;

means for calculating mortgage obligations and terms from the acquired data and identifications;

means for printing the mortgage document using the acquired data and identifications; and means for periodically calculating the equity interest in the value of the real property by multiplying an original value of said property by a generally available house price index, as a proxy for the value and changes in such value of such property, and printing the results of said calculation.

18. The system of claim 17 wherein the house price index is the Bureau of Census Price Index of New One-Family Houses Sold (by region).

19. The system of claim 17 wherein the means for calculating the equity interest in the value of real property includes:

(a) means for dividing the house price index at the termination of the mortgage by the same index at inception to obtain a ratio;

(b) means for multiplying the ratio by the original purchase price of the house to obtain the gross house value at termination;

(c) means for subtracting mortgagee debt obligations from the gross house value to determine a net value for equity sharing; and (d) means for multiplying the net value for equity sharing by a fixed equity sharing percent to determine the equity interest for the mortgagee.

20. A method as in claim 19 wherein the means for calculating the value of the equity interest of mortgagee includes means for applying a selling cost allowance as a percentage reduction to the gross house value activatable to determine a net house value at termination after allowance for selling costs before activating the means for subtracting determine the net value for equity sharing.

21. A computer system for preparing single-issue, multi-part mortgage documents, wherein the multiple payment obligations of mortgagor to multiple mortgagees under said parts varies as to term of each obligation and the amount and timing of the repayment of such obligations to each mortgagee, and where one or more part or obligation provides for an equity interest in the value of the real property subject to the mortgage, said system comprising:

a memory for storing data from issuer regarding the terms of multi-part mortgage obligations and customer identifications from potential mortgagors as to financing requirements and options;

means for calculating mortgage obligations and terms from the acquired data and identifications; and means for printing the mortgage document using the acquired data and identifications.

22. The system of claim 21 in which mortgagor payments to reduce a debt obligation on one part of a multi-part mortgage also serve to increase the value of another mortgagee part based on an equity interest in the real property value subject to the mortgage.

23. The system of claim 21 further comprising:
(a) first means for determining a percentage composition and amounts of mortgage financing for a purchase of real property as between homeowner and multiple mortgagees;
(b) second means for determining monthly mortgagor payment obligations using assumptions of interest rates to be earned over the life of the mortgage on each mortgagee's capital advanced to mortgagor for the purchase of the real property subject to mortgage;
(c) third means for determining, from the percentage composition, amounts of mortgage financing and mortgagor payment obligations, at least one of actual and anticipated return on investment for the mortgagee with an equity interest in the value of real property given an equity sharing percent, actual value of the property based on proceeds, at least one of anticipated and measured value of such property using an index of house values, the timing and amount of periodic mortgage payments, time of termination, and selling allowances percentage; and
(d) means for printing a report of distribution of proceeds as between mortgagor and mortgagees upon actual or pro-forma termination of the mortgage, where such termination may occur anytime from inception to expiration of the stated term of the instrument.

24. The system of claim 23 further comprising:

means for receiving and storing cash payment data from mortgagors, and house price index data from available sources, means for calculating outstanding balances of mortgagor debt obligations and mortgagee debt and equity balances as of the beginning and end of a payment period; and means for printing a statement of the calculated obligations and balances.

25. A system for generating a monthly statement for a single issue, multi-part mortgage document wherein multiple payment obligations of a mortgagor to multiple mortgagees under said parts varies as to term of each obligation and an amount of timing of repayment of such obligations each mortgagee, wherein the mortgagee shares an equity interest in the value of the real property subject to the mortgage in exchange for funds provided by mortgagee to mortgagor in order to acquire a title in such property, the system including:

means for calculating mortgage obligations and terms based on terms from an issuer of the mortgage, and from customer identifications from potential mortgagors as to financing requirements and options;

means, operative periodically, for calculating new mortgage balances, and for calculating the value of the homeowners equity share based on the latest house price indices, and for activating a printer to print a mortgage statement.

26. A system for terminating a single issue multi-part mortgage document wherein multiple payment obligations of a mortagor to multiple mortgagees under said parts varies as determined of each obligation and an amount of timing of repayment of such obligations to each mortgagee, the mortgagee sharing an equity interest in the value of the real property subject to the mortgage in exchange for funds provided by mortgagee to mortgagor in order to acquire title in such property, wherein one part of the mortgage is an equity part obligation which provides for a separately marketable equity interest, the system including:

means for receiving input termination variables, input origination variables and an input mortgage file;

means for calculating a net house value;

means for calculating the remaining equity part obligation;

means for adding the calculated equity share to the debt of the equity part;

means for comparing the proceeds of the sale to the sum of the equity part obligation and other obligations;

means, operative when proceeds from a sale are less than said sum, for reducing pro rata the second part obligation and the first part obligation and reducing the equity part obligation by return on investment limits; and means for printing settlement results.

* * * * *